(12) United States Patent
Ikeda

(10) Patent No.: US 8,393,630 B2
(45) Date of Patent: Mar. 12, 2013

(54) STRADDLE-TYPE VEHICLE

(75) Inventor: Yoshihiro Ikeda, Shizuoak-Ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 13/408,390

(22) Filed: Feb. 29, 2012

(65) Prior Publication Data

US 2012/0223505 A1    Sep. 6, 2012

(30) Foreign Application Priority Data

Mar. 1, 2011    (JP) .................................. 2011-044121

(51) Int. Cl.
*B62J 25/00* (2006.01)
(52) U.S. Cl. .................................... 280/291; 280/288.4
(58) Field of Classification Search .................. 280/291, 280/288.4, 294, 281.1, 163, 164.1; 180/219
See application file for complete search history.

(56) References Cited

U.S. PATENT DOCUMENTS

| | | | |
|---|---|---|---|
| 2003/0151227 A1* | 8/2003 | Tokumura et al. | 280/291 |
| 2005/0279555 A1* | 12/2005 | Suzuki | 180/219 |
| 2006/0071550 A1* | 4/2006 | Buckley | 303/137 |
| 2010/0243359 A1* | 9/2010 | Cheng et al. | 180/219 |
| 2012/0074667 A1* | 3/2012 | Matsushima et al. | 280/291 |

FOREIGN PATENT DOCUMENTS

| | | |
|---|---|---|
| JP | 2003089382 | 3/2003 |
| JP | 2005306171 | 11/2005 |

* cited by examiner

*Primary Examiner* — Tashiana Adams
(74) *Attorney, Agent, or Firm* — Barnes & Thornburg LLP

(57) ABSTRACT

A straddle-type vehicle including a vehicle body frame having a vehicle body, an engine supported by the vehicle body frame, a footrest disposed to a front lower portion of the engine, a footrest bracket for attaching the footrest to the vehicle body frame, and a braking unit. The braking unit includes a brake pedal arranged in the vicinity of the footrest and turned by a pedaling force of the rider, a master cylinder operated by the brake pedal, and a reservoir that supplies a hydraulic fluid to the master cylinder. The master cylinder is disposed behind the footrest bracket such that a cylinder axial line thereof is substantially horizontal and at least a part of a front half thereof overlaps with the footrest bracket as viewed from both a side of a vehicle and a bottom side thereof.

16 Claims, 12 Drawing Sheets

STRADDLE-TYPE VEHICLE

PRIORITY CLAIM

This patent application claims priority to Japanese Patent Application No. 2011-044121, filed 1 Mar. 2011, the disclosure of which is incorporated herein by reference in its entirety.

BACKGROUND

1. Field

The disclosed embodiment relates to a straddle-type vehicle in which a braking unit is placed in the vicinity of a footrest.

2. Related Art

In so-called a cruiser-type motorcycle, i.e., straddle-type vehicle, typically, a footrest on which a rider puts or rests his/her feet on a footrest is arranged in a front lower portion of a vehicle body, and a braking unit is arranged in the vicinity of the footrest. In conventional technology, as such motorcycle, Patent Document 1 (Japanese Patent Application Laid-Open Publication No. 2003-89382) discloses a motorcycle in which a master cylinder of a braking unit is vertically placed, and a reservoir that supplies hydraulic fluid to the master cylinder is disposed at a position higher than that of the master cylinder in order to prevent air bubbles from mixing with the hydraulic fluid in the master cylinder.

In addition, Patent Document 2 (Japanese Patent Application Laid-Open Publication No. 2005-306171) discloses a motorcycle in which a master cylinder and a reservoir of a braking unit are disposed at positions spaced apart from a brake pedal arranged in the vicinity of a footrest, that is, on the rear side of the vehicle.

However, unfortunately, in the motorcycle disclosed in Patent Document 1, the master cylinder of the braking unit is vertically arranged and the reservoir is placed at the position higher than that of the master cylinder. Therefore, the master cylinder and the reservoir are unfavorably exposed in side areas of an engine and an exhaust pipe, so that the external appearance of the vehicle may be impaired.

In the case where the master cylinder is disposed in the vicinity of the engine or the exhaust pipe, temperature of the hydraulic fluid may be increased by heat from such heat generating components.

Moreover, in the case where the master cylinder is disposed in the vicinity of the footrest, the master cylinder is located near a front wheel, which may result in damaging of the master cylinder or in creation of dirty state by scattering substances (for example, flying stone, muddy water, and sandy dust) thrown up by the front wheel during running.

In the motorcycle disclosed in Patent Document 2, the master cylinder of the braking unit is spaced apart from the brake pedal, and hence, a power transmitting member needs to be provided therebetween. Furthermore, a bracket for attaching the master cylinder and the reservoir to a vehicle body frame needs to be provided in addition to a bracket for attaching the brake pedal to the vehicle body frame. As a result, the number of components increases, assembling work is made complicated, which may result in poor productivity of the motorcycle.

SUMMARY

The disclosed embodiment provides a straddle-type vehicle in which a master cylinder of a braking unit can be disposed in the vicinity of a footrest without impairing the external appearance of the vehicle.

The disclosed embodiment provides a straddle-type vehicle including: a vehicle body frame composing a vehicle body; an engine supported by the vehicle body frame; a footrest, on which a rider's foot puts, disposed to a front lower portion of the engine; a footrest bracket for attaching the footrest to the vehicle body frame; and a braking unit including a brake pedal that is arranged in a vicinity of the footrest and turned by a pedaling force of the rider, a master cylinder operated by the brake pedal, and a reservoir that supplies a hydraulic fluid to the master cylinder, the master cylinder being disposed behind the footrest bracket such that a cylinder axial line thereof is set to be substantially horizontal and at least a part of a front half thereof overlaps with the footrest bracket as viewed from both a side of a vehicle and a bottom side thereof.

In the disclosed embodiment, it is desirable that the master cylinder is arranged on a lower side of the vehicle body with respect to a part of an engine case of the engine, and the master cylinder is disposed on an inner side of the vehicle with respect to a part of an exhaust pipe extending from the engine.

It may be desired that the cylinder axial line of the master cylinder is disposed on a lower side of the vehicle body with respect to a rotating shaft of the brake pedal.

It may be also desired that the reservoir may be also disposed on an inner side of the vehicle body with respect to the footrest and the brake pedal so as to overlap with the footrest and the brake pedal in the vehicle right side view. The braking unit may be constituted by the brake pedal, the master cylinder, and the reservoir which are attached to the footrest bracket, respectively.

According to the disclosed embodiment, the master cylinder is disposed behind the footrest bracket, and the cylinder axial line thereof is set to be substantially horizontal. Hence, the master cylinder can be disposed at a position lower than that of the footrest. Furthermore, the master cylinder is arranged so that at least a part of the front half thereof overlaps with the footrest bracket in the vehicle right side view and the vehicle bottom view. According to such layout, the outer and lower portions of the master cylinder can be hidden by the footrest bracket. As a result, the master cylinder of the braking unit can be located in the vicinity of the footrest without impairing the external appearance of the vehicle.

The nature and further characteristic features of the present invention will be made clearer from the following descriptions made with reference to the accompanying drawings.

DESCRIPTION OF THE DISCLOSED EMBODIMENT

Hereinafter, the disclosed embodiment will be described with reference to the accompanying drawings. Further, it is to be noted that the present invention is not limited to the disclosed embodiment. Also note that terms such as "upper", "lower", "right", "left" and the like terms representing direction are used herein with reference to the illustration of the drawings or in a normal standing or running state of a vehicle such as straddle-type motorcycle.

Figure 1:
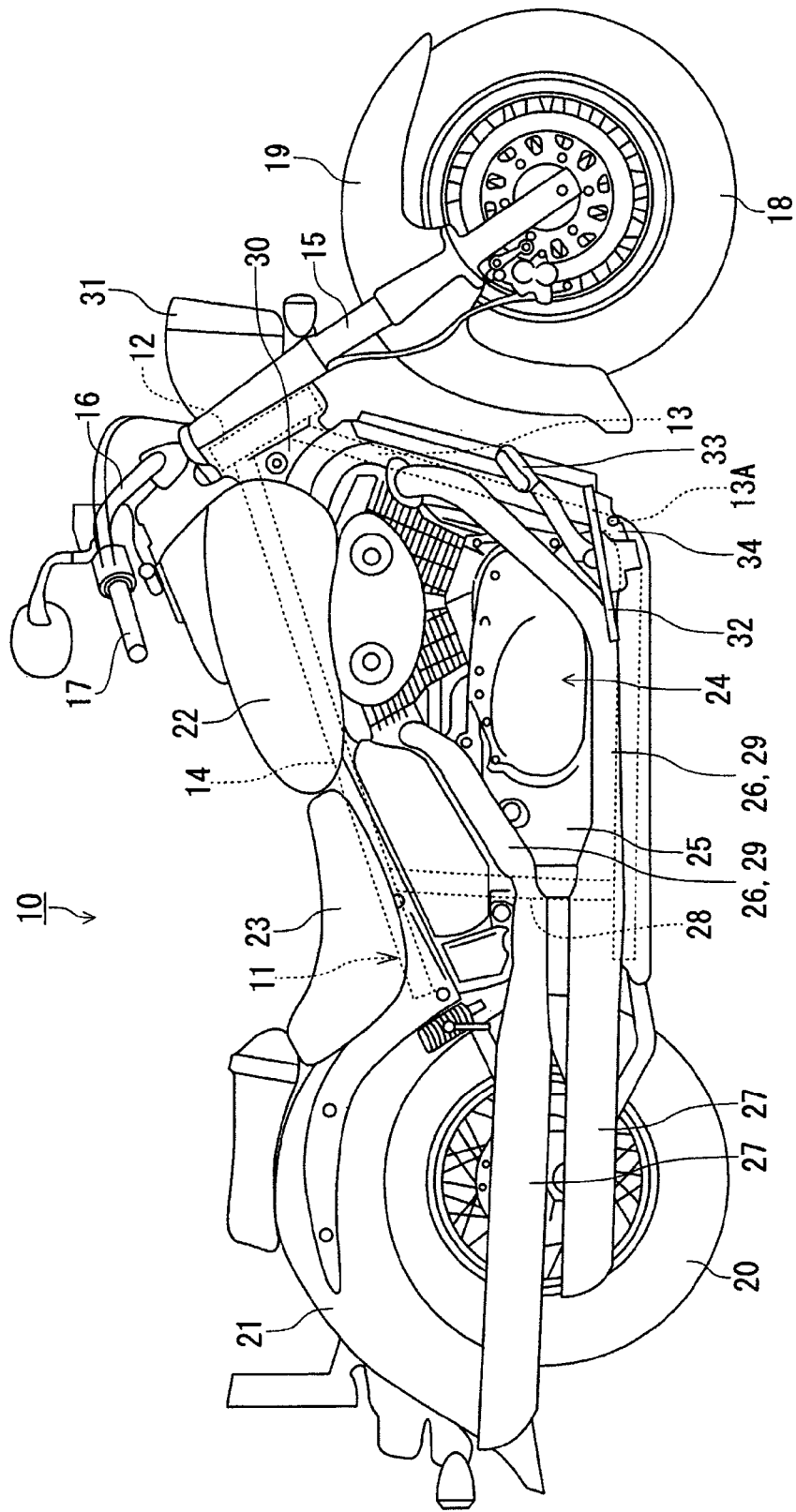
FIG. 1 is a right side view illustrating a motorcycle to which the disclosed embodiment of a straddle-type vehicle is applied.

FIG. 1 illustrates a motorcycle 10, which is a straddle-type vehicle, so-called a cruiser motorcycle. The motorcycle 10 includes a vehicle body frame 11 constituting a vehicle body made of steel or aluminum alloy, and the vehicle body frame 11 includes a head pipe 12, a pair of right and left down tubes 13, and a pair of right and left tank rails 14.

The head pipe 12 is provided with a front fork 15 that is pivotally supported to be steerable to the right and left sides. A handle bar 16 is fixed to an upper end of the front fork 15, and grips 17 are respectively attached to both ends in a vehicle width direction of the handle bar 16. A front wheel 18 is rotatably supported by a lower end of the front fork 15, and a front fender 19 is fixed so as to cover an upper portion of the front wheel 18.

Front ends of the pair of right and left down tubes 13 are joined to the head pipe 12. The down tubes 13 are branched from the head pipe 12 to the right and left side along the vehicle body so as to extend downward. The lower portions of the extended down tubes 13 are then bent and further extend substantially horizontally toward the rear (back) side of the vehicle.

At the rear portion of the down tubes 13, a swing arm, not shown, is pivotally supported in a swingable manner using a swing arm bracket 28 to be described later. A rear wheel 20 is rotatably supported by a rear end of the swing arm, and a rear fender 21 is placed above the rear wheel 20.

The pair of right and left tank rails 14 are joined to the head pipe 12 together at front ends thereof. The tank rails 14 are branched from the head pipe 12 to the right and left sides, and extend obliquely downward and rearward of the vehicle body. The tank rails 14 and seat rails, not shown, coupled to the tank rails 14, support a teardrop-shaped fuel tank 22, a seat 23, and the rear fender 21 in the stated order from the front side of the vehicle.

An engine 24 is mounted between the down tubes 13 and the tank rails 14. In the disclosed embodiment, the engine 24 is a water-cooled V-twin-cylinder engine, and is configured as one unit with a transmission being housed in an engine case 25. Exhaust pipes 26 are connected to the engine 24 and extend toward the rear side of the vehicle body. An exhaust muffler 27 is connected to a rear end of each exhaust pipe 26. The exhaust pipe 26 is actually covered substantially entirely by an exhaust pipe cover 29.

The down tubes 13 and the tank rails 14 are coupled by a plurality of cross members on each of the right and left sides of the vehicle body and are coupled by the swing arm bracket 28 and a seat pillar, not shown, in the vertical (top-bottom) direction of the vehicle. A frame cover 30 is provided for the down tubes 13 so as to cover the front ends of the down tubes 13 on both the right and left sides of the vehicle body, and a headlight unit 31 is supported by a vehicle front-side portion of the frame cover 30 or a vehicle front-side portion of the head pipe 12.

Figure 2:
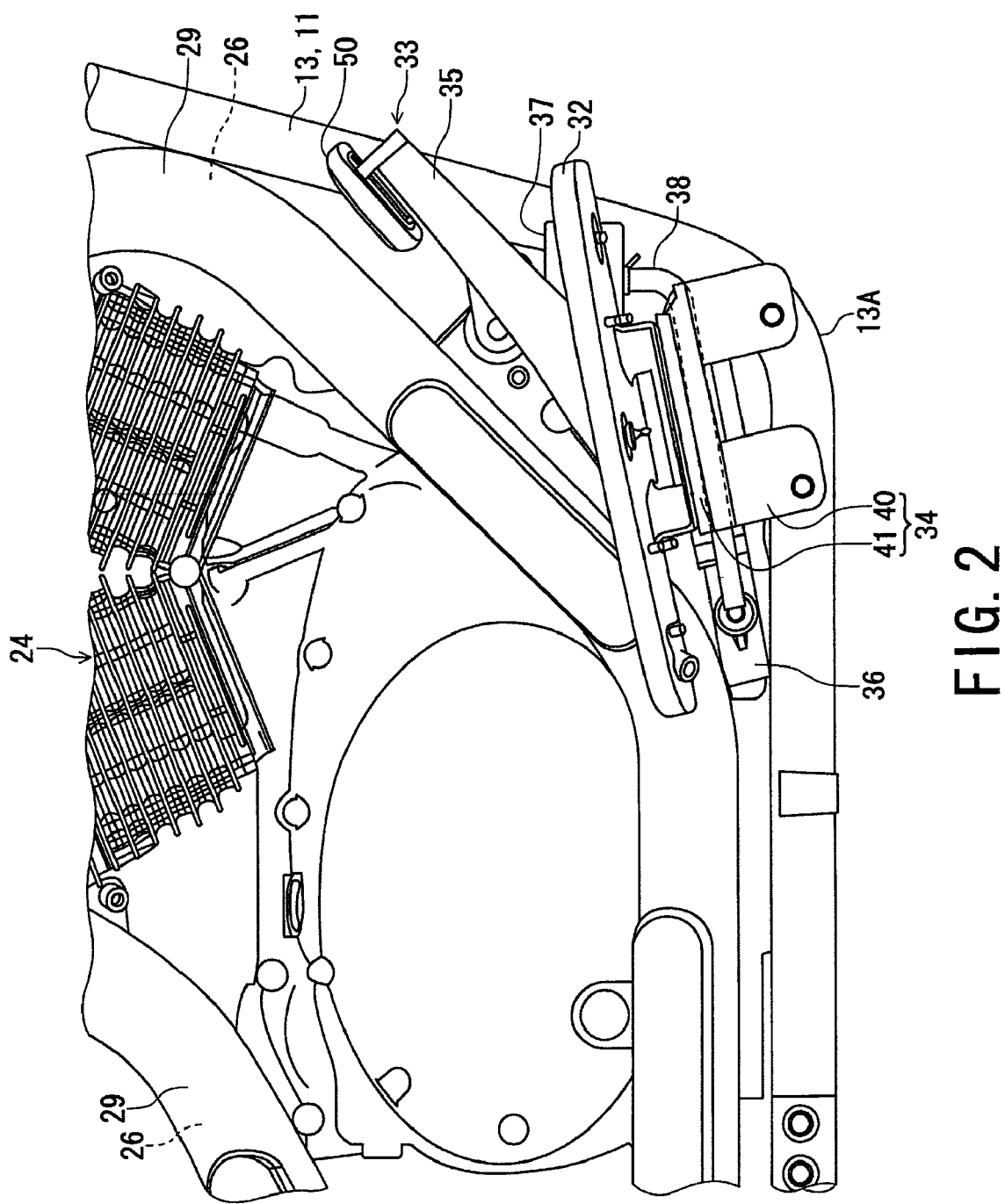
FIG. 2 is a right side view, in an enlarged scale, illustrating a footrest and a braking unit of the motorcycle in FIG. 1.

As illustrated also in FIG. 2, a footrest 32 which is disposed so as to protrude outward in the vehicle width direction so that the rider can put his/her feet thereon, and a braking unit 33 for braking the vehicle is also arranged to the periphery of the lower bent portion 13A of the down tube 13 corresponding a front lower portion of the engine 24. The footrest 32 and the braking unit 33 are arranged by means of footrest bracket 34.

Figure 3:
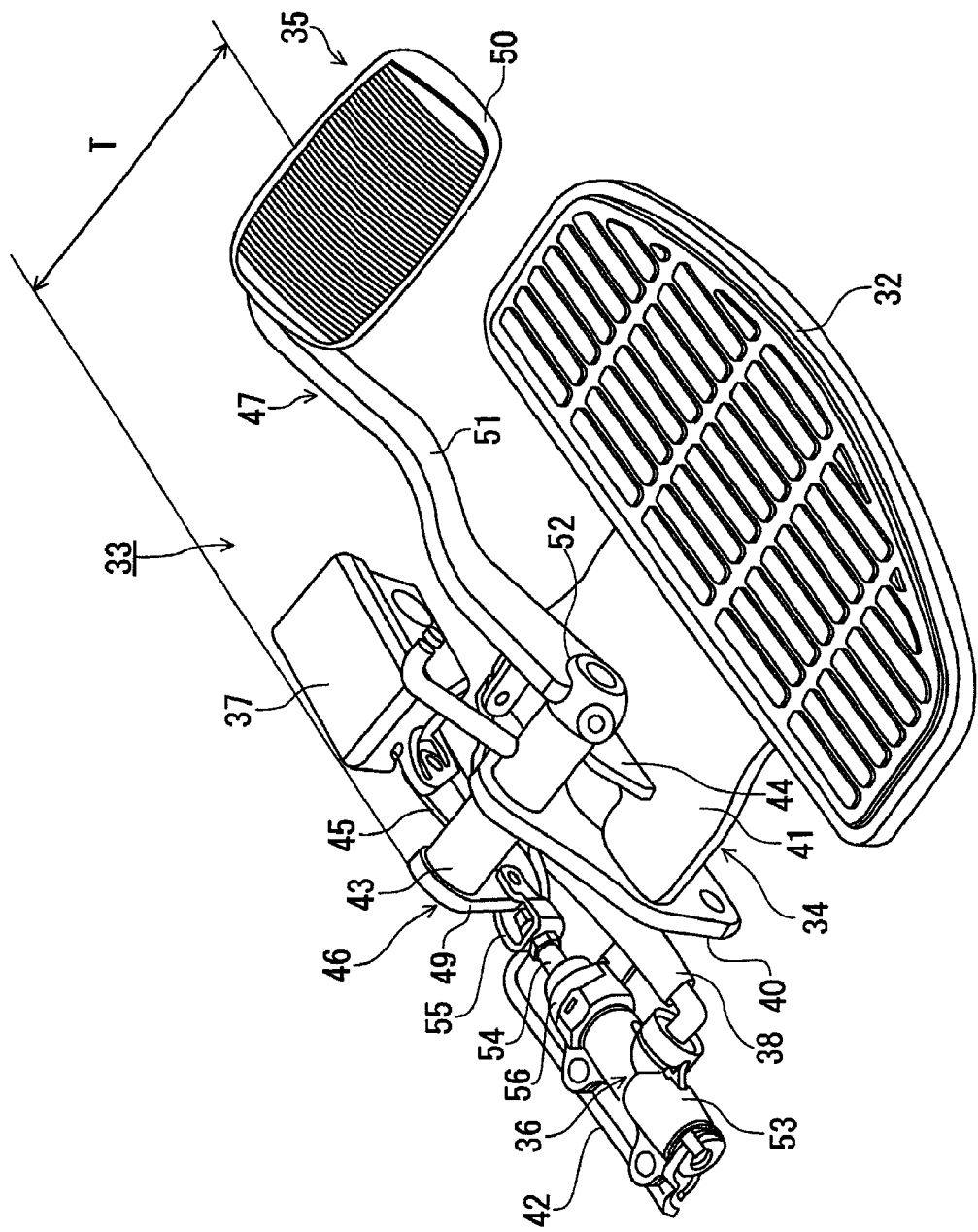
FIG. 3 is a perspective view, in an enlarged scale, of the footrest and the braking unit in FIG. 2.
Figure 4:
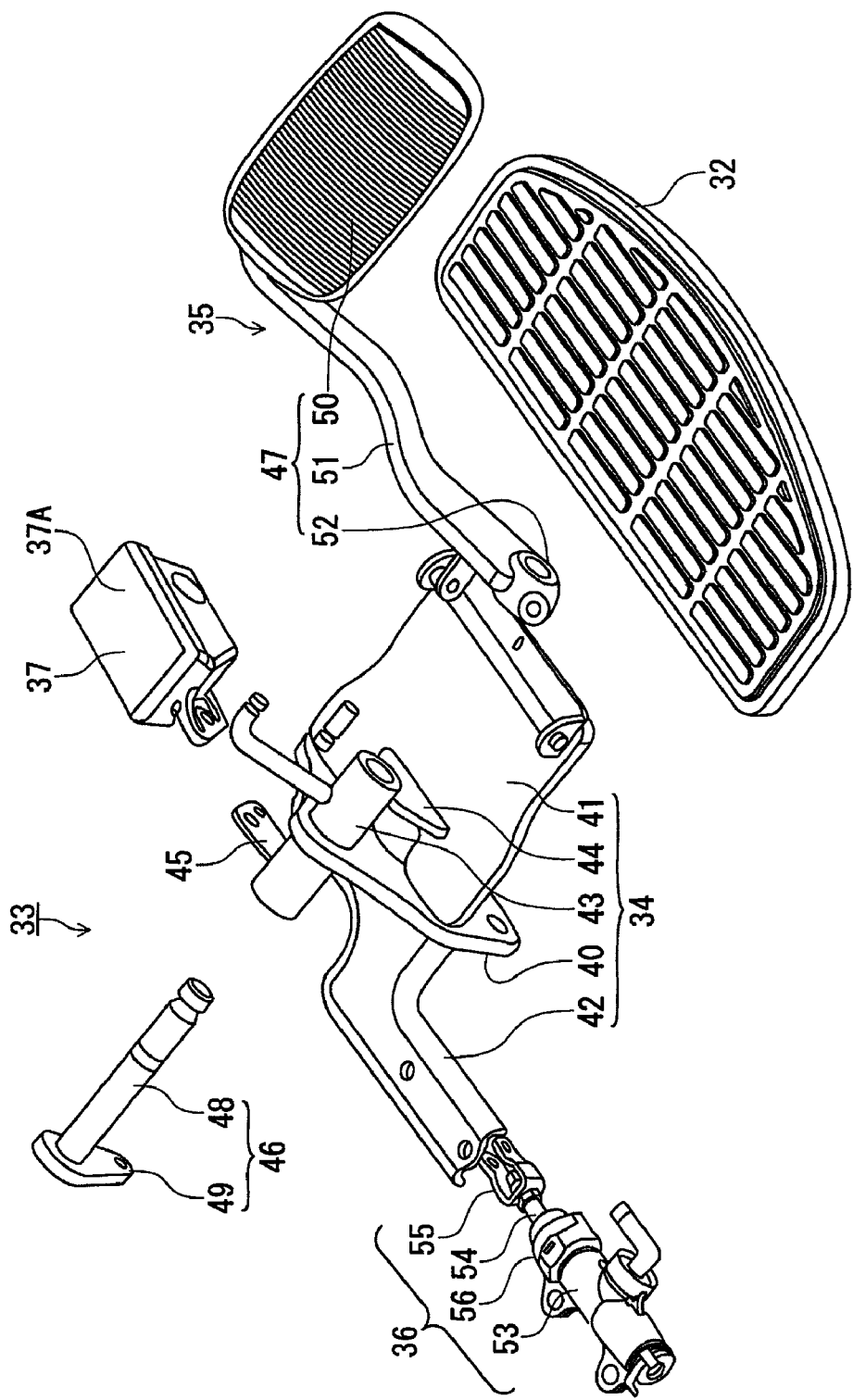
FIG. 4 is an exploded perspective view of the footrest and the braking unit in FIG. 3.

As illustrated in FIG. 2 to FIG. 4, the footrest 32 is a plate-like footrest called step plate and extends along the longitudinal direction (i.e., the vehicle front-rear direction). The braking unit 33 includes: a brake pedal 35 that is provided in the vicinity of the footrest 32 and turns when a pedaling force of the rider acts thereon; a master cylinder 36 that is operated by the turning of the brake pedal 35; a reservoir 37 that supplies hydraulic fluid as a hydraulic fluid to the master cylinder 36; and a hydraulic fluid hose 38 that couples the master cylinder 36 to the reservoir 37 so that the hydraulic fluid passes through the inside of the hydraulic fluid hose 38.

The footrest bracket 34 is configured in the following manner. As illustrated in FIG. 3 and FIG. 4, a first horizontal plate portion 41 and a second horizontal plate portion 42 are provided integrally with a vertical plate portion 40 on both sides thereof so as to extend in opposite directions, and a boss portion 43 perpendicularly penetrates the vertical plate portion 40 so as to be integrated therewith. The boss portion 43 is supported by the vertical plate portion 40 and a supporting plate 44 that erects upward from the first horizontal plate portion 41.

Figure 5:
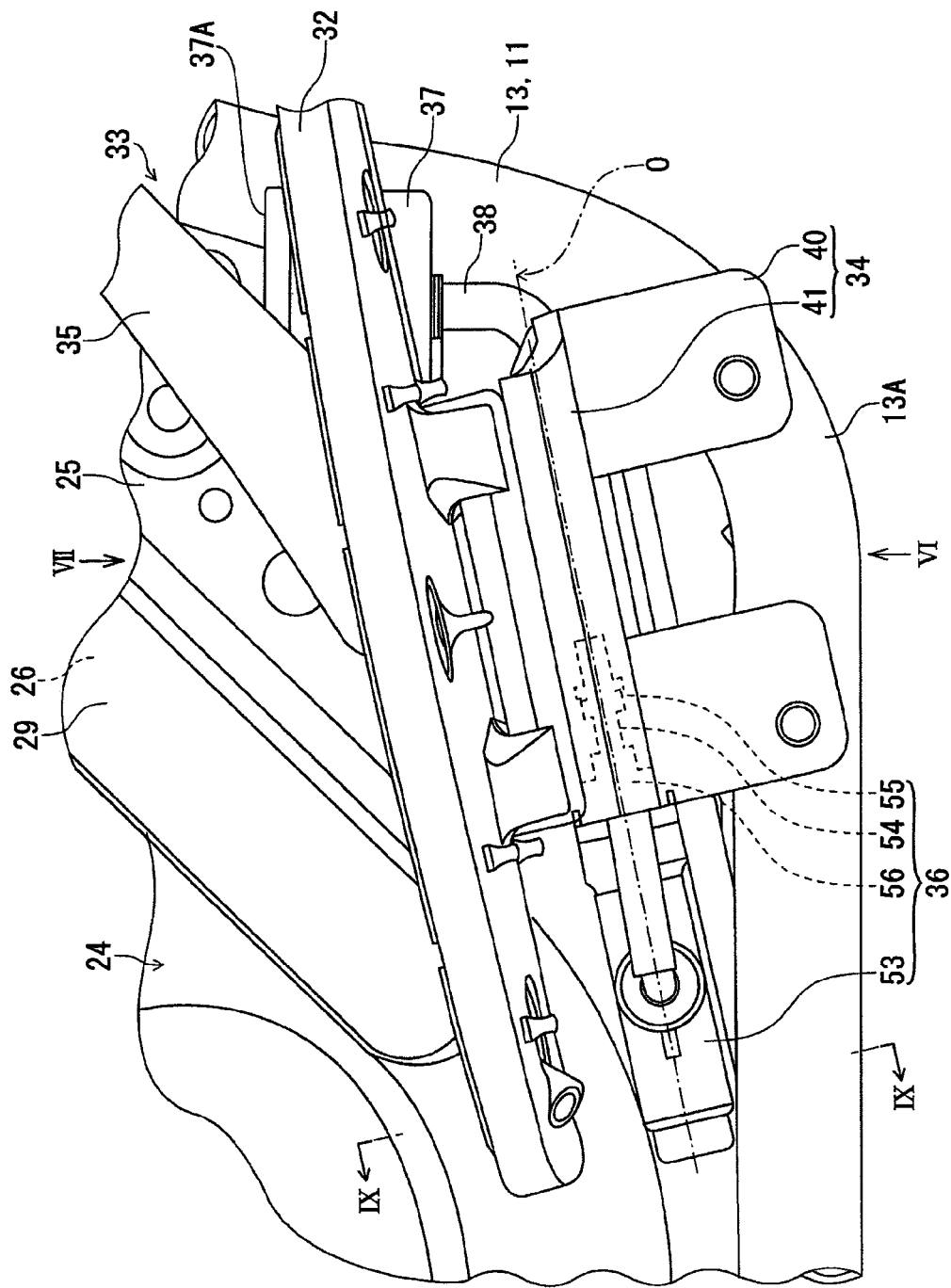
FIG. 5 is an enlarged right side view illustrating a periphery of the footrest in FIG. 2.
Figure 6:
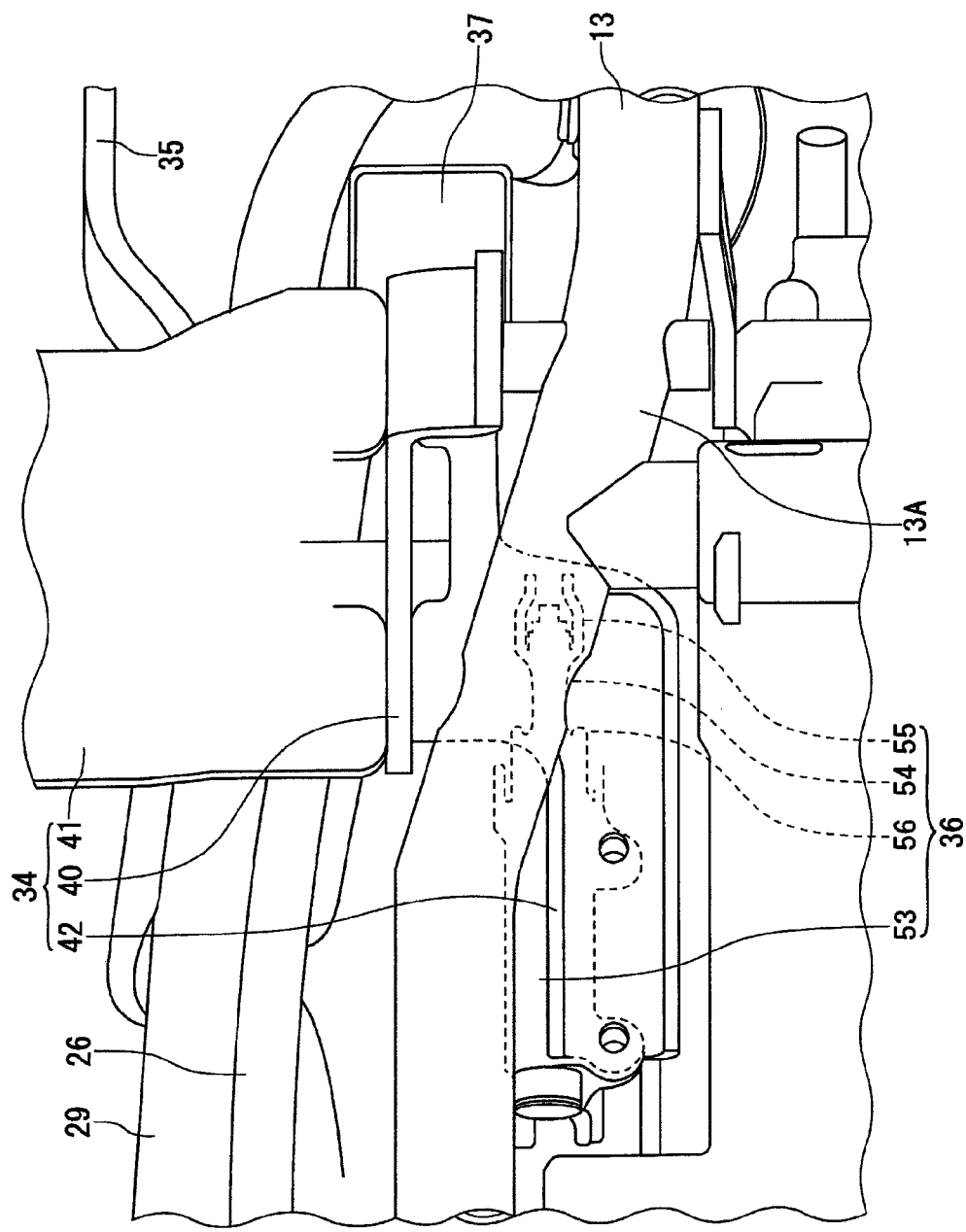
FIG. 6 is an illustration viewed from a direction indicated by an arrow VI in FIG. 5.

As illustrated in FIG. 5 and FIG. 6, a lower portion of the vertical plate portion 40 is fixed to the lower bent portion 13A of the down tube 13 by means of attachment bolts, not shown.

The brake pedal 35, the master cylinder 36, and the reservoir 37 of the braking unit 33 are attached to the footrest bracket 34, respectively, as well as the footrest 32.

Specifically, as illustrated in FIG. 3, FIG. 4 and FIG. 5, the footrest 32 is attached to the first horizontal plate portion 41 of the footrest bracket 34 substantially horizontally, and more precisely, slightly downward than horizontally, with respect to the vehicle body. The footrest 32 is pivotally supported by the first horizontal plate portion 41 so as to take a horizontal state or a vertical state.

Figure 7:
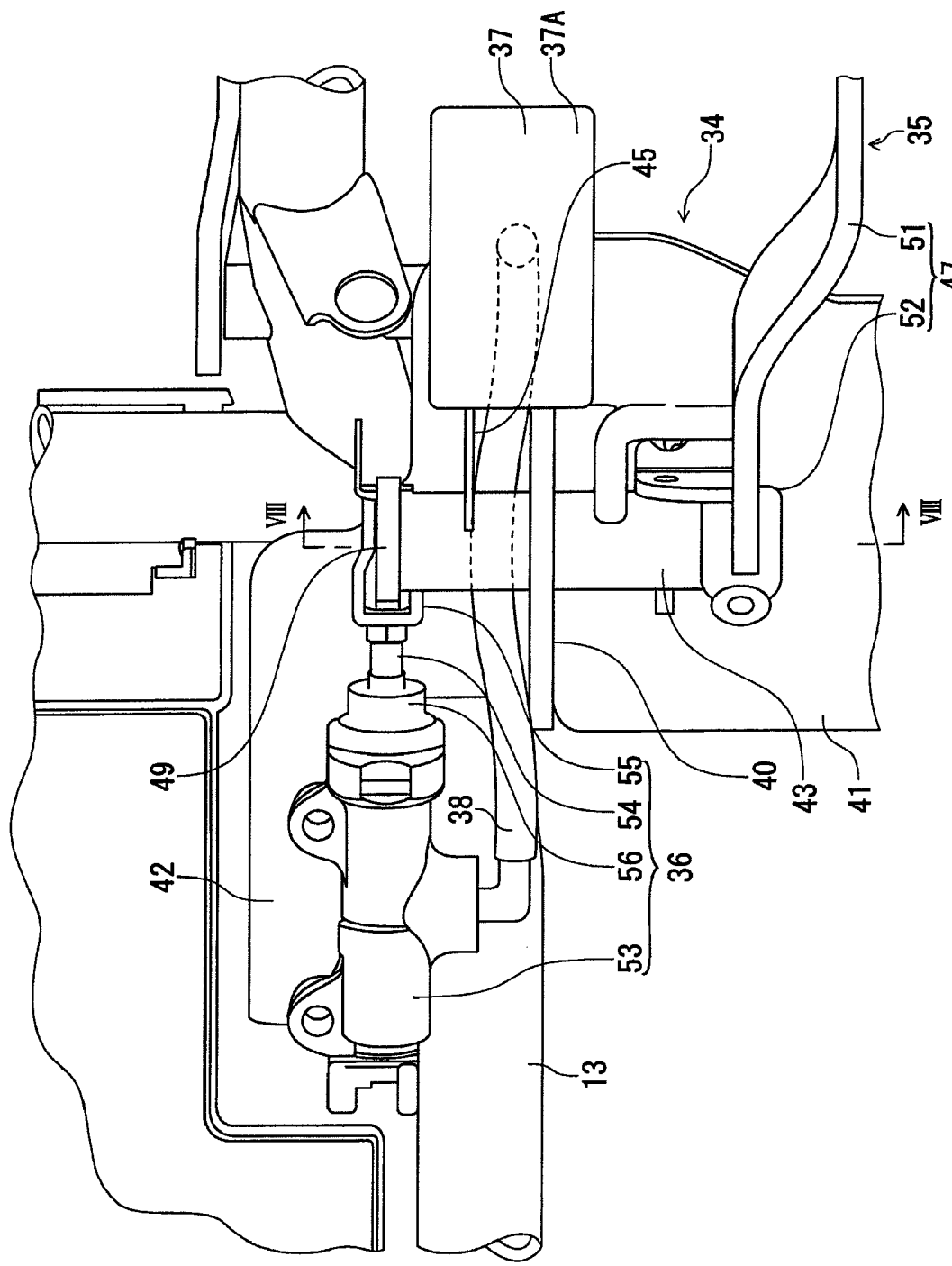
FIG. 7 is an illustration viewed from a direction indicated by an arrow VII in FIG. 5.

Further, as illustrated in FIG. 3, FIG. 4 and FIG. 7, the master cylinder 36 of the braking unit 33 is fixed to be detachable by means of bolts to the second horizontal plate portion 42 of the footrest bracket 34.

The reservoir 37 of the braking unit 33 is fixed to be detachably by means of bolts to an attachment piece 45 extending integrally from the boss portion 43 of the footrest bracket 34. The brake pedal 35 is pivotally supported by the boss portion 43 of the footrest bracket 34.

As illustrated in FIG. 3 and FIG. 4, the brake pedal 35 includes a rod arm portion 46 and a pedal arm portion 47.

The rod arm portion 46 includes a rotating shaft 48 rotatably inserted into the boss portion 43 of the footrest bracket 34, and an actuating lever 49 joined to the rotating shaft 48 so as to be rotated integrally therewith and coupled to a yoke 55 of the master cylinder 36.

The pedal arm portion 47 includes a pedal plate 50 bearing a pedaling force from each foot of the rider, an arm member 51 having one end coupled to the pedal plate 50, and a fixing member 52 joined to another end of the arm member 51 and detachably fixed to the rotating shaft 48 so as to be rotated integrally therewith.

The actuating lever 49 of the rod arm portion 46 is shifted by an offset T toward the inner side of the vehicle body in an axial direction of the rotating shaft 48 with respect to the pedal plate 50 of the pedal arm portion 47.

Figure 8:
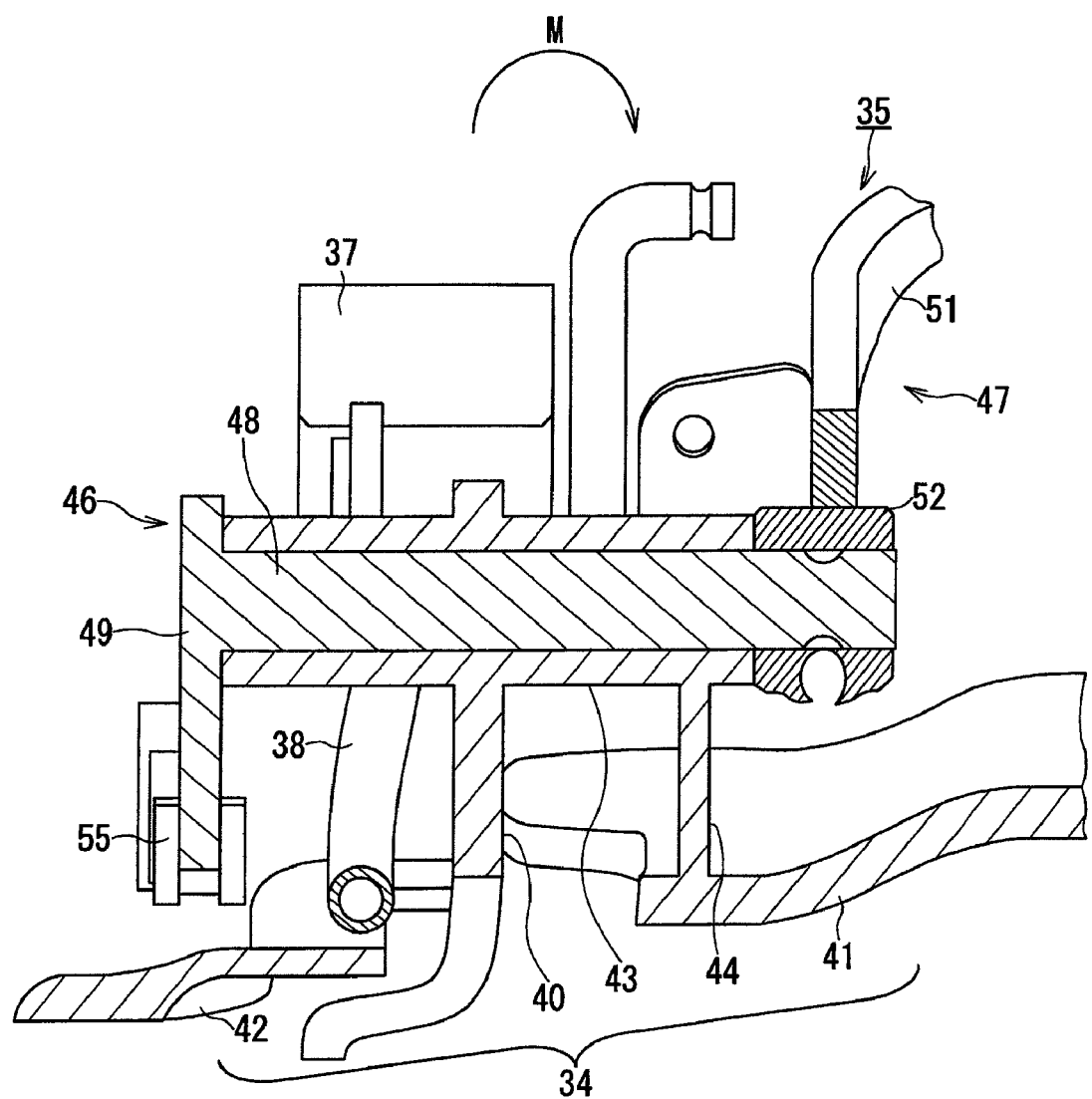
FIG. 8 is a cross-sectional view taken along the line VIII-VIII in FIG. 7.

As illustrated also in FIG. 8, the rotating shaft 48 of the rod arm portion 46 is rotatably supported by the boss portion 43 of the footrest bracket 34, in a region between the actuating lever 49 and the fixing member 52 of the pedal arm portion 47. A load acting on the boss portion 34 is supported directly by the vertical plate portion 40 as well as by the first horizontal plate portion 41 through the intermediation of the supporting plate 44.

In the master cylinder 36, as illustrated in FIG. 3 and FIG. 7, a push rod 54 retractably extends from a cylinder portion 53, and the yoke 55 is joined to a leading end of the push rod 54. A dustproof cover (boot) 56 that is in sliding contact with the push rod 54 is fitted to the cylinder portion 53. The cylinder portion 53 is connected to the reservoir 37 through the hydraulic fluid hose 38 (FIG. 2), which is an elastic pipe, and the cylinder portion 53 is connected to a brake caliper, not shown, on the rear wheel 20 side through a hydraulic pressure hose, not shown.

When a pedaling force acts on the pedal plate 50 of the brake pedal 35 shown in FIG. 3 and FIG. 4, the rotating shaft 48 rotates, the actuating lever 49 accordingly turns, and the push rod 54 of the master cylinder 36 is moved toward the cylinder portion 53. According to such motion, a hydraulic pressure is applied to the master cylinder 36, and the hydraulic fluid is fed under pressure to the brake caliper on the rear wheel 20 side through the hydraulic pressure hose, whereby the rear wheel 20 is braked.

As illustrated in FIG. 5, FIG. 6 and FIG. 7, the master cylinder 36 of the braking unit 33 is arranged behind the footrest bracket 34 such that the yoke 55 side thereof is oriented to the front side of the vehicle so that a cylinder axial line O (FIG. 5) is set to be substantially horizontal.

Further, the master cylinder 36 is arranged such that at least a portion of a front half thereof (in the disclosed embodiment, the dustproof cover 56, the push rod 54, and the yoke 55 of the master cylinder 36) overlaps with the footrest bracket 34 as viewed from a vehicle right side (FIG. 5) so as to be covered by the footrest bracket 34. In addition, the master cylinder 36 is disposed such that at least a portion of the front half thereof (in the disclosed embodiment, a large portion including the dustproof cover 56, the push rod 54, and the yoke 55 of the master cylinder 36) overlaps with the footrest bracket 34 and the down tube 13 as viewed from the bottom side of FIG. 6 so as to be covered by the footrest bracket 34 and the down tube 13.

Figure 9:
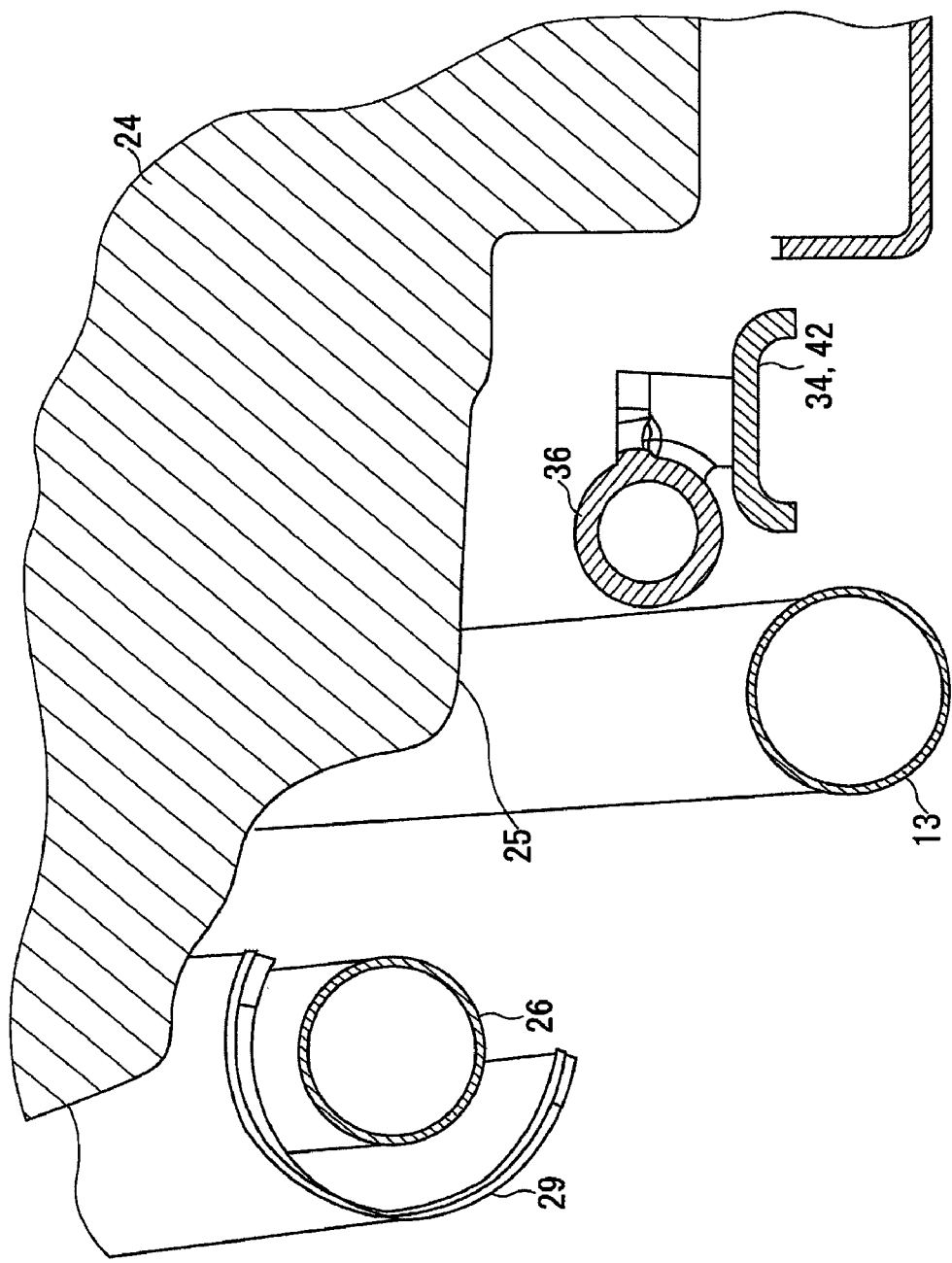
FIG. 9 is a cross-sectional view taken along the line IX-IX in FIG. 5.

Furthermore, the master cylinder 36 is provided on the inner side of the vehicle body with respect to the footrest 32, and is placed on the lower side of the vehicle body with respect to the footrest 32 as the viewed from the vehicle right side in FIG. 5. In addition, as illustrated in FIG. 9, the master cylinder 36 is disposed on the lower side of the vehicle body with respect to a part of the engine case 25 of the engine 24, and is placed on the inner side of the vehicle body with respect to a part of the exhaust pipe 26 extending from the engine 24.

Figure 10:
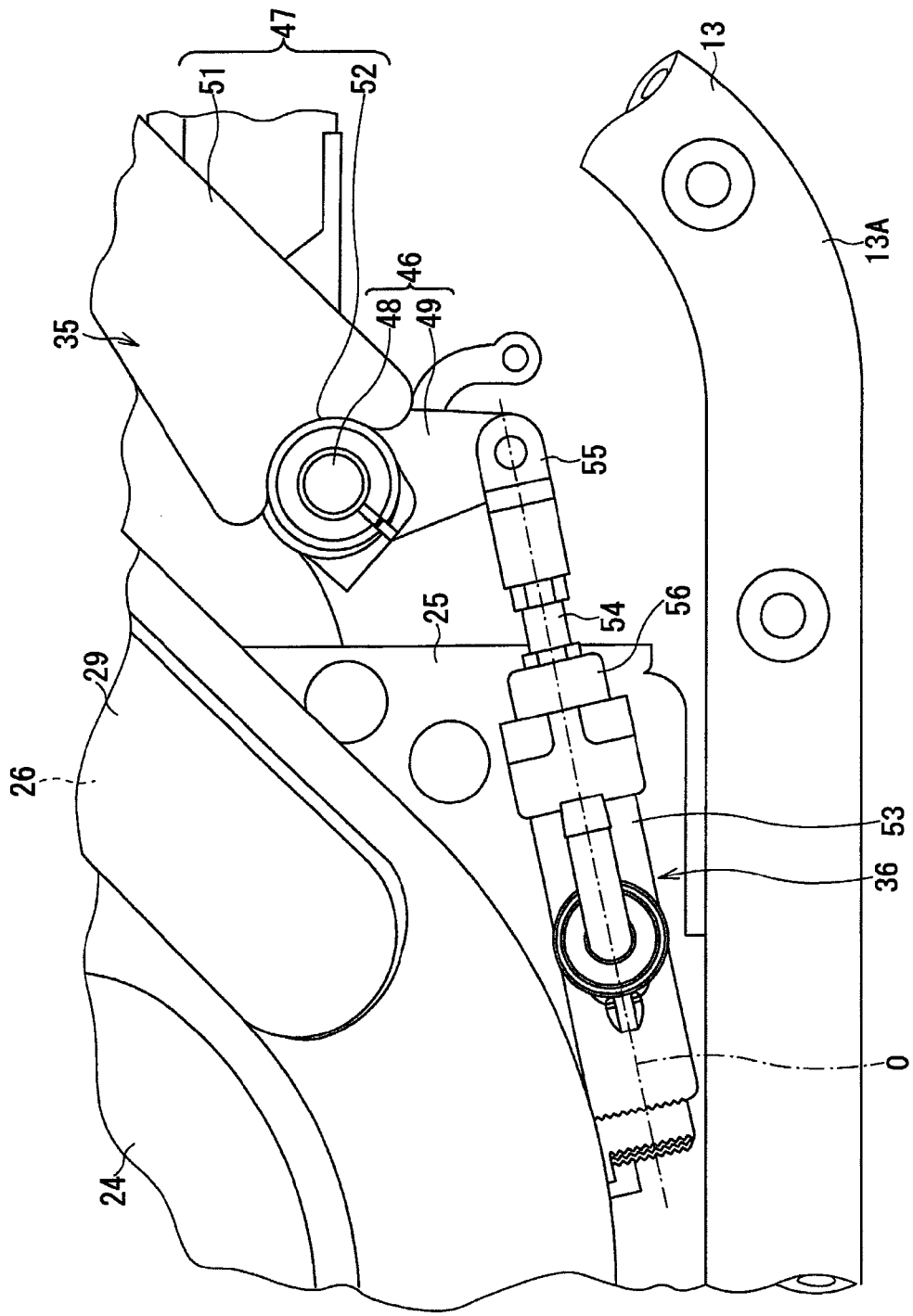
FIG. 10 is a right side view illustrating the braking unit shown in FIG. 5 from which the footrest and a footrest bracket are removed.

Still furthermore, as illustrated in FIG. 10, the master cylinder 36 is disposed on the lower side of the vehicle body with respect to the rotating shaft 48 of the brake pedal 35.

Figure 11:
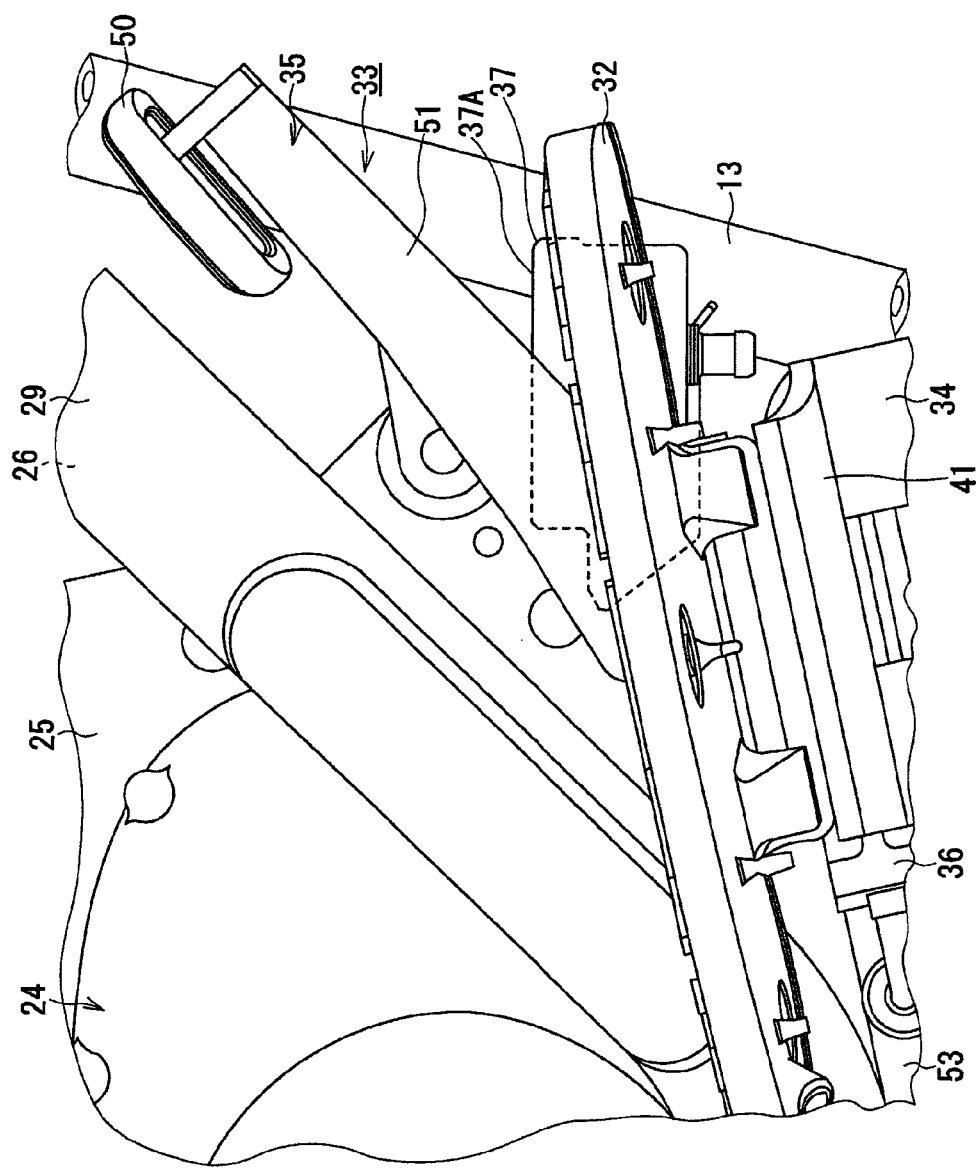
FIG. 11 is an enlarged right side view illustrating the footrest and the braking unit in FIG. 2 and showing a reservoir.
Figure 12:
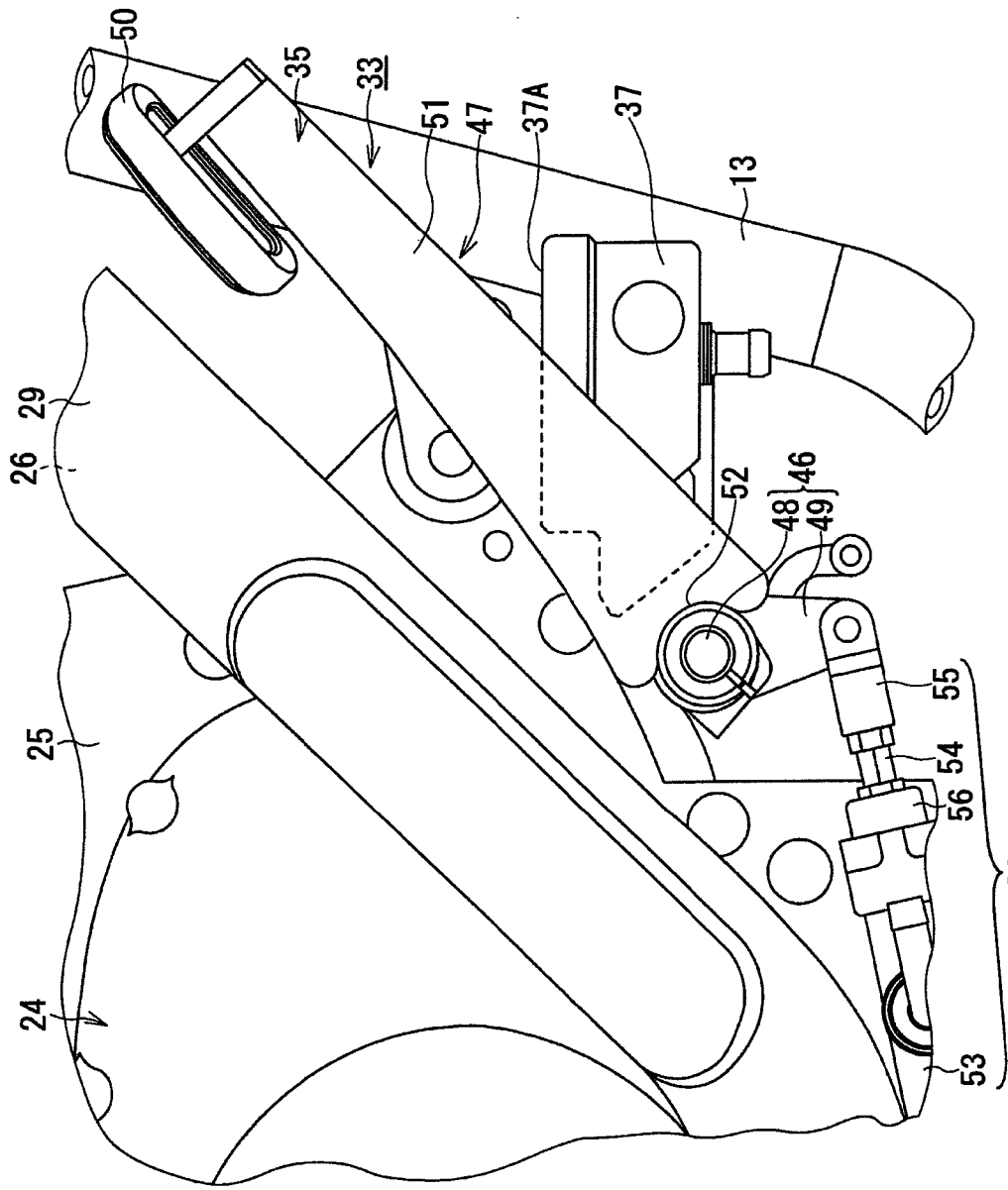
FIG. 12 is a right side view illustrating the braking unit shown in FIG. 11 from which the footrest and the footrest bracket are removed.

With reference to FIG. 7 and FIG. 11, the reservoir 37 of the braking unit 33 is positioned on the inner side of the vehicle body with respect to the footrest 32 and the brake pedal 35 so that at least a part of the reservoir 37 overlaps with the footrest 32 and the brake pedal 35 in the vehicle right side view. In addition, as illustrated in FIG. 12, the reservoir 37 is disposed on the front side of the vehicle body with respect to the rotating shaft 48 of the brake pedal 35 so as to extend substantially along the down tube 13. The reservoir 37 may optionally be disposed in a manner such that an uppermost surface 37A thereof takes a position lower than a lowermost position of a pedaling margin of the brake pedal 35. The hydraulic fluid hose 38 may be supported by using a supporting member between the master cylinder 36 and the reservoir 37, and the supporting member may be fixed to the footrest bracket 34.

According to the disclosed embodiment of the structures and characters mentioned above, the following advantageous effects and/or functions (1) to (10) will be attained.

First, as illustrated in FIG. 5 and FIG. 6, the master cylinder 36 of the braking unit 33 is arranged behind the footrest bracket 34, and the cylinder axial line O is set to be substantially horizontal. According to such arrangement, the master cylinder 36 can be disposed at a position lower than that of the footrest 32. Furthermore, since the master cylinder 36 is arranged so that at least a part of the front half thereof overlaps with the footrest bracket 34 in the vehicle right side view of FIG. 5 and the vehicle bottom view of FIG. 6, the vehicle outer and lower portions of the master cylinder 36 can be hidden by the footrest bracket 34. As a result, the master cylinder 36 of the braking unit 33 can be disposed in the vicinity of the footrest 32 without impairing the external appearance of the vehicle.

The front half of the master cylinder 36 including the push rod 54 and the dust cover 56 partially overlaps with the footrest bracket 34 in the vehicle right side view of FIG. 5 and the vehicle bottom view of FIG. 6 and covered by the footrest cover 34. As a result, low-durability components of the master cylinder 36, particularly, the push rod 54 and the dustproof cover 56, can be protected against scattering substances (for example, flying stone, muddy water, and sandy dust) coming from the front side of the vehicle and obliquely from the lower side of the vehicle.

As described above, the front half of the master cylinder 36 is partially covered by the footrest bracket 34 in the vehicle right side view and the vehicle bottom view, and the low-durability components of the master cylinder 36 are protected against the scattering substances. Therefore, the master cylinder 36 can be disposed with a higher degree of freedom in arrangement in the vehicle width direction. Accordingly, as illustrated in FIG. 3 and FIG. 7, the offset T between the actuating lever 49 (positioned on the cylinder axial line O of the master cylinder 36) and the pedal plate 50 of the brake pedal 35 can be reduced, As a result, a moment M shown in FIG. 8 around an axis perpendicular to the rotating shaft 48 of the brake pedal 35 decreases, and hence, it is not necessary to set the rigidity of the footrest bracket 34 supporting the rotating shaft 48 to a height position. Accordingly, the size and weight of the footrest bracket 34 can be reduced.

As illustrated in FIG. 9, the master cylinder 36 is placed on the lower side of the vehicle body with respect to the engine case 25 of the engine 24 and is placed on the inner side of the vehicle body with respect to the exhaust pipe 26 and the exhaust pipe cover 29. As a result, the master cylinder 36 is surrounded by the engine case 25, the exhaust pipe 26, and the exhaust pipe cover 29, thus being less exposed outside, and hence, enhancing the external appearance of the vehicle.

Further, as illustrated in FIG. 5 and FIG. 7, since the master cylinder 36 is arranged on the inner side of and on the lower side of the vehicle body with respect to the footrest 32 in the vehicle right side view, the master cylinder 36 can be similarly hidden by the footrest 32, thus enhancing the external appearance of the vehicle, thus being advantageous.

As illustrated in FIG. 10, the cylinder axial line O of the master cylinder 36 is set on the lower side of the vehicle with respect to the rotating shaft 48 of the brake pedal 35. As a result, a pedaling force acting on the pedal plate 50 of the brake pedal 35 can be efficiently transmitted to the master cylinder 36, and it is hence not necessary to locate any power transmitting member between the brake pedal 35 and the master cylinder 36. For this reason, the weight of the motorcycle 10 can be reduced, and the improved productivity of the motorcycle 10 can be achieved.

As illustrated in FIG. 7 and FIG. 11, in the disclosed embodiment, the reservoir 37 of the braking unit 33 is arranged in the vicinity of the footrest 32 on the inner side of the vehicle body with respect to the footrest 32 and the brake pedal 35 such that at least a part of the reservoir 37 overlaps with the footrest 32 and the brake pedal 35 in the vehicle right side view. As a result, the reservoir 37 having a relatively large size can be arranged at a low position and can be hidden by the footrest 32 and the brake pedal 35, thus enhancing the external appearance of the vehicle.

Further, as illustrated in FIG. 12, the reservoir 37 is disposed on the front side of the vehicle body with respect to the rotating shaft 48 of the brake pedal 35 so as to extend substantially along the down tube 13. As a result, the reservoir 37 is spaced apart from the engine 24 and the exhaust pipe 26, which acts as heat generating equipments, and hence, the temperature of the hydraulic fluid in the reservoir 37 can be suppressed from increasing.

The uppermost surface 37A of the reservoir 37 is positioned at a level of the location lower than the lowermost position of the pedaling margin of the brake pedal 35. Hence, when the rider presses the pedal plate 50 of the brake pedal 35, any projecting or projected components or like that may obstruct this pressing operation does not exist, thus enhancing and improving the operability of the brake.

As illustrated in FIG. 3 and FIG. 4, since the brake pedal 35, the master cylinder 36 and the reservoir 37 constituting the braking unit 33 are collectively attached to the footrest bracket 34, the braking unit 33 can be modularized before being incorporated into the vehicle body frame 11. As a result, the incorporation or assembling workability and accuracy of the braking unit 33 can be effectively improved. Furthermore, a special bracket is not necessary for incorporating the braking unit 33 into the vehicle body frame 11, thus being convenient. In addition, according to the disclosed embodiment, the number of components to be arranged can be reduced, and the productivity of the motorcycle 10 can be enhanced.

It is finally to be noted that the present invention is not limited to the disclosed embodiment and many other changes and modifications or alternations may be made without departing from the scopes of the appended claims.

For example, although, for the disclosed embodiment, the description was made with reference to the straddle-type vehicle of a cruiser motorcycle in the illustration, the present invention may be applied to a four-wheel or three-wheel straddle-type vehicle (such as so-called dune buggy).

What is claimed is:

1. A straddle-type vehicle comprising:
a vehicle body frame composing a vehicle body;
an engine supported by the vehicle body frame;
a footrest, on which a rider's foot puts, disposed in a front lower portion of the engine;
a footrest bracket for attaching the footrest to the vehicle body frame; and
a braking unit including a brake pedal that is arranged in a vicinity of the footrest and turned by a pedaling force of the rider, a master cylinder operated by the brake pedal, and a reservoir that supplies a hydraulic fluid to the master cylinder;
the master cylinder being disposed behind the footrest bracket such that a cylinder axial line thereof is set to be substantially horizontal and at least a part of a front half thereof overlaps with the footrest bracket as viewed from both a side of a vehicle and a bottom side thereof.

2. The straddle-type vehicle according to claim 1, wherein the master cylinder is disposed on a lower side of the vehicle body with respect to a part of an engine case of the engine, and the master cylinder is disposed on an inner side of the vehicle with respect to a part of an exhaust pipe extending from the engine.

3. The straddle-type vehicle according to claim 2, wherein the cylinder axial line of the master cylinder is disposed on a lower side of the vehicle body with respect to a rotating shaft of the brake pedal.

4. The straddle-type vehicle according to claim 3, wherein the reservoir is disposed on an inner side of the vehicle body with respect to the footrest and the brake pedal so as to overlap with the footrest and the brake pedal in the vehicle right side view.

5. The straddle-type vehicle according to claim 4, wherein the reservoir is disposed on a front side of the vehicle body with respect to the rotating shaft of the brake pedal.

6. The straddle-type vehicle according to claim 5, wherein the brake pedal, the master cylinder, and the reservoir constituting the braking unit are attached to the footrest bracket, respectively.

7. The straddle-type vehicle according to claim 4, wherein the brake pedal, the master cylinder, and the reservoir constituting the braking unit are attached to the footrest bracket, respectively.

8. The straddle-type vehicle according to claim 1, wherein the cylinder axial line of the master cylinder is disposed on a lower side of the vehicle body with respect to a rotating shaft of the brake pedal.

9. The straddle-type vehicle according to claim 8, wherein the reservoir is disposed on an inner side of the vehicle body with respect to the footrest and the brake pedal so as to overlap with the footrest and the brake pedal in the vehicle right side view.

10. The straddle-type vehicle according to claim 9, wherein the reservoir is disposed on a front side of the vehicle body with respect to the rotating shaft of the brake pedal.

11. The straddle-type vehicle according to claim 10, wherein the brake pedal, the master cylinder, and the reservoir constituting the braking unit are attached to the footrest bracket, respectively.

12. The straddle-type vehicle according to claim 9, wherein the brake pedal, the master cylinder, and the reservoir constituting the braking unit are attached to the footrest bracket, respectively.

13. The straddle-type vehicle according to claim 1, wherein the reservoir is disposed on an inner side of the vehicle body with respect to the footrest and the brake pedal so as to overlap with the footrest and the brake pedal in the vehicle right side view.

14. The straddle-type vehicle according to claim 13, wherein the reservoir is disposed on a front side of the vehicle body with respect to the rotating shaft of the brake pedal.

15. The straddle-type vehicle according to claim 14, wherein the brake pedal, the master cylinder, and the reservoir constituting the braking unit are attached to the footrest bracket, respectively.

16. The straddle-type vehicle according to claim 13, wherein the brake pedal, the master cylinder, and the reservoir constituting the braking unit are attached to the footrest bracket, respectively.

* * * * *